(12) United States Patent
Gasser

(10) Patent No.: US 8,235,711 B2
(45) Date of Patent: Aug. 7, 2012

(54) METHOD AND DEVICE FOR REMOVING VOLATILE ORGANIC COMPONENTS FROM WASTE GASES OF A CLINKER INSTALLATION

(75) Inventor: Urs Gasser, Rüfenach (CH)

(73) Assignee: Holcim Technology Ltd., Jona (CH)

( * ) Notice: Subject to any disclaimer, the term of this patent is extended or adjusted under 35 U.S.C. 154(b) by 931 days.

(21) Appl. No.: 11/990,232

(22) PCT Filed: Aug. 11, 2006

(86) PCT No.: PCT/IB2006/002192
§ 371 (c)(1),
(2), (4) Date: Nov. 19, 2008

(87) PCT Pub. No.: WO2007/017746
PCT Pub. Date: Feb. 15, 2007

(65) Prior Publication Data
US 2009/0136886 A1    May 28, 2009

(30) Foreign Application Priority Data

Aug. 11, 2005  (AT) ................ A 1356/2005

(51) Int. Cl.
*F27B 15/02*  (2006.01)
(52) U.S. Cl. .......................... 432/16; 432/14
(58) Field of Classification Search .......... 432/147, 432/16, 58, 106; 106/752
See application file for complete search history.

(56) References Cited

U.S. PATENT DOCUMENTS

| | | | |
|---|---|---|---|
| 4,474,010 A * | 10/1984 | Shibuya et al. | 60/648 |
| 4,496,313 A * | 1/1985 | Quittkat et al. | 432/14 |
| 5,365,866 A | 11/1994 | Von Seebach et al. | |
| 6,447,598 B2 | 9/2002 | Kuhnke et al. | |
| 6,601,541 B2 * | 8/2003 | Burdis et al. | 122/4 D |
| 6,691,628 B2 | 2/2004 | Meyer et al. | |
| 6,755,906 B2 | 6/2004 | Jorget et al. | |
| 7,296,994 B2 * | 11/2007 | Meyer et al. | 432/58 |
| 2010/0180803 A1 * | 7/2010 | Hansen | 106/771 |

FOREIGN PATENT DOCUMENTS

| | | |
|---|---|---|
| DE | 35 23 677 A1 | 1/1987 |
| DE | 199 62 536 A1 | 7/2001 |
| DE | 101 46 418 A1 | 4/2003 |
| EP | 1 146 021 A1 | 10/2001 |
| EP | 1 219 336 A1 | 7/2002 |
| WO | WO 2005/0260710 A1 | 3/2005 |

* cited by examiner

*Primary Examiner* — Gregory A Wilson
(74) *Attorney, Agent, or Firm* — Chapman and Cutler LLP

(57) ABSTRACT

Method and device for removing volatile organic components (VOC) from waste gases of a cement clinker kiln installation. Cooled waste gases are subjected to post-combustion carried out to an extent ensuring a concentration reduction of the VOC below admissible values. Post-combustion is carried out for production of vapor, dimensioned for a gas volume to be post-combusted, ensuring that a partial quantity of the waste gas corresponding to the gas volume allows for the reduction of emitted VOC per unit time in the waste gas below admissible concentration values by rarefaction. The partial quantity of the waste gas is simultaneously dimensioned for production of an amount of vapor sufficient for economical operation of a steam turbine. The device includes a branch line connected to a waste gas line between a pre-calciner and a waste gas suction fan, and a combustion chamber and a turbine connected to the branch line.

3 Claims, No Drawings

METHOD AND DEVICE FOR REMOVING VOLATILE ORGANIC COMPONENTS FROM WASTE GASES OF A CLINKER INSTALLATION

The invention relates to a method and a device for removing volatile organic components (VOC) from waste gases of a clinker installation, in which the largely cooled waste gases are subjected to post-combustion.

The document DE 101 46 418 A1 shows and describes a method, in which volatile organic components (VOC) are removed by post-combustion. In the production of cement clinker from cement raw meal, it is by all means possible, that raw material is used, which is not only containing sulphides and hence can lead to sulphur contamination of the waste gases, but also show an increased content of TOC (total organic carbon). In modern clinker installations the raw meal is preheated in multi-stage preheaters and in particular in cyclone stages of a heat exchanger line, whereby the raw meal is kept afloat in the cyclone stages. To this end, hot waste gas is drawn off the rotary kiln and conducted through the cyclone stages, whereby the hot waste gases are cooled in the individual stages and in return the fed-in raw meal is heated. In particular in the upper cyclone stages for a respective raw meal with an increased TOC-content a considerable fraction of volatile organic components or VOC can be expelled and arrives subsequently uncontrolled into the waste gases, without burning up. The document DE 101 46 418 A1 has proposed to install an oxidation zone into the waste gas line downstream the heat exchanger line in direction of the gas flow, through whose open flame the waste gas is forced and thereby effectively oxidized. Such a device implies, that the gases, that are already considerably cooled at this point and are mostly burned out except for the volatile organic components, are heated again from temperatures of about 300° C. to 900° C., to safeguard the combustion of the volatile organic components. In other concepts, even the whole process gas including water vapour and leak air has to be heated from about 100° C. to 900° C. after the raw mill. As in this arrangement the whole gas volume extracted from the rotary kiln has to be heated again, a high energy input is required, whereby the produced hot waste gas can be used again only for preheating needs, for instance in a grind drying installation.

The latent heat of hot gases can naturally be used in different ways. In gas turbines and in particular water vapour turbines for the operation of electric generators, the production of hot waste gases for the production of superheated water vapour in heat exchangers has to be planned accurately, for such steam turbines call for a defined current of water vapour for an efficient operation. To safeguard a corresponding economic efficiency a large amount of hot combustion gases has to be provided, as can be achieved normally by direct combustion of high-grade combustibles only. The sole heating of large amounts of gas, which only has a very low calorific value, would have to be classified as mostly uneconomical, such that, until now, the latent heat accruing in a more or less uncontrolled way was dissipated.

The invention aims to use the advantages of energy recovery in a steam turbine along with a corresponding reduction of the VOCs in the waste gas. To this end, according to the inventive method, it is proceeded such that a post-combustion is carried out to an extent as to ensure a reduction of the concentration of the VOC below the admissible threshold values and that the post-combustion is carried out for the production of vapour, whereby the production of vapour in the post-combustion is dimensioned for a gas volume to be post-combusted, ensuring that a partial quantity of the waste gas corresponding to the gas volume allows for the reduction of emitted VOC per unit time in the waste gas below admissible concentration values by rarefaction and whereby this partial quantity is simultaneously dimensioned for the production of an amount of vapour sufficient for the economical operation of a given steam turbine. Due to the fact, that for the economic operation of a given steam turbine exact parameters have to be maintained, a corresponding dimensioning of the correlated aggregates is envisaged according to the invention. The steam turbine is thus not designed for complete heating of the total amount of waste gas of the rotary kiln, as this amounts to a needless heating of large amounts of more or less inert gases and thus would only show a marginal economic efficiency. According to the invention the steam turbine is rather dimensioned such, that lesser amounts than the total amount of waste gas will suffice, whereby here again the limiting value is chosen, such that the partial quantity is branched off the flow of waste gases, which safeguards in each case, that after complete combustion of volatile components in this partial quantity the total amount of the subsequently emitted VOCs per unit time stays below the legally admissible concentration values. The fact that not the total amount of the mostly inert gases has to be reheated for the production of vapour in order to reduce the VOC-content, increases the economic efficiency of the method considerably, as it is now sufficient to heat exactly the amount of more or less inert gases, whose heating, in turn, results in the burning up of exactly the amount of VOCs, which in total yield the release of an admissible amount of VOCs per unit time. Simultaneously this partial quantity is optimally adjusted to the requirements of the consecutive steam turbine, such that in total an economic method can be achieved.

The device according to the invention for removing volatile organic components from waste gases of a cement clinker kiln installation, in which the largely cooled waste gases are subjected to a post-combustion, is in general characterized in that a branch line is connected to the waste gas line of the cement clinker kiln installation, between the pre-calciner and the waste gas suction fan, to which branch line a combustion chamber for a heat exchanger for the production of vapour and a steam turbine are connected. The preheaters in modern cement clinker installations are, as already mentioned, designed as cyclone/fluidized bed-heat exchangers and, in most cases, a plurality of such cyclones is connected in series, in order to form a heat exchanger line. The temperature of the hot gases drawn off the cement clinker kiln is hereby incrementally reduced, whereby the branch line corresponding to the pressure drops in the individual stages of the heat exchanger line does not necessarily have to be connected to the last heat exchanger, but rather permits an outward transfer already on a higher temperature level. The temperature level is in any case selected, such that it can be assumed, that at lower temperatures a combustion of VOCs does no more occur and conversely a release of VOCs is possible without difficulty. Strictly speaking, this applies to temperatures $\leq 300°$ C. and in most cases corresponds to the temperature of the waste gases at the inlet of the preheater for the raw meal.

A feedback of the amount of gas that leaves the heat exchanger for the vapour production can be effected preferably to the raw meal mill or to the grind drying installation. The device is thus preferably devised such, that that the branch line is arranged between the preheater and a raw meal mill.

By the device according to the invention in total the advantage is achieved, that it can be done without an uneconomical complete post-combustion and simultaneously the energy utilized for the post-combustion can be optimally used for the production of vapour and for the relaxation of the vapour in a steam turbine. Thus, the latent heat of the gases heated to correspondingly high temperatures of up to 900° C. for the combustion of VOCs is better used, such that the economic efficiency of the entire method is increased.

The invention claimed is:

1. Method for removing volatile organic components (VOC) from waste gases of a cement clinker kiln installation, comprising the step of subjecting largely cooled waste gases to post-combustion, wherein
   the post-combustion is carried out to an extent as to ensure a reduction of a concentration of the VOC below admissible threshold values, and
   the post-combustion is carried out for production of vapour,
      whereby the production of vapour in the post-combustion is dimensioned for a gas volume to be post-combusted, ensuring that a partial quantity of the waste gas corresponding to the gas volume allows for reduction of emitted VOC per unit time in the waste gas below admissible concentration values by rarefaction, and
      whereby the partial quantity of the waste gas is simultaneously dimensioned for production of an amount of vapour sufficient for economical operation of a given steam turbine.

2. Device for removing volatile organic components (VOC) from waste gases of a cement clinker kiln installation, in which largely cooled waste gases are subjected to a post-combustion, comprising:
   a branch line connected to a waste gas line of the cement clinker kiln installation,
   said branch line being connected between a pre-calciner and a waste gas suction fan,
   a combustion chamber for a heat exchanger for production of vapour, and
   a steam turbine,
   said combustion chamber and steam turbine being connected to said branch line.

3. Device according to claim 2, wherein the branch line is arranged between a preheater and a raw meal mill.

* * * * *